United States Patent [19]
Birchenough et al.

[11] Patent Number: 5,594,643
[45] Date of Patent: Jan. 14, 1997

[54] METHOD AND SYSTEM FOR DIAGNOSING A DRIVETRAIN DURING SHIFTING OPERATIONS

[75] Inventors: Charles W. Birchenough, Morton; Hans P. Dietz, Champaign; Dwight S. Holloway, Chillicothe; Noel J. Rytter; Rolland D. Scholl, both of Dunlap; Lorne W. Tweed, Peoria, all of Ill.

[73] Assignee: Caterpillar Inc., Peoria, Ill.

[21] Appl. No.: 425,680

[22] Filed: Apr. 18, 1995

Related U.S. Application Data

[63] Continuation of Ser. No. 21,439, Feb. 24, 1993, abandoned.

[51] Int. Cl.⁶ .............................. G06F 19/00; F16H 59/74
[52] U.S. Cl. ................... 364/424.08; 477/154; 477/155; 477/102; 74/335; 74/336 R
[58] Field of Search ............................ 364/424.1, 431.03; 477/154, 155, 905–906, 98, 61, 119, 148, 160–163, 39, 117, 102, 109, 159, 62–65; 192/3.31, 103 F; 123/417, 418; 74/335, 336 R; 73/118.1

[56] References Cited

U.S. PATENT DOCUMENTS

| | | | |
|---|---|---|---|
| 4,334,441 | 6/1982 | Iwanaga et al. | 477/159 |
| 4,334,442 | 6/1982 | Iwanaga et al. | 477/141 |
| 4,707,789 | 11/1987 | Downs et al. | 364/424.1 |
| 4,779,490 | 10/1988 | Milunas et al. | 364/424.1 |
| 4,788,890 | 12/1988 | Anderson | 477/102 |
| 4,800,378 | 1/1989 | Putrow et al. | 364/431.03 |
| 4,809,660 | 3/1989 | Marsh et al. | 364/431.03 |
| 4,858,499 | 8/1989 | Ito et al. | 477/63 |
| 4,905,544 | 3/1990 | Ganoung | 477/109 |
| 4,967,620 | 11/1990 | Shimanaka | 477/155 |
| 5,047,936 | 9/1991 | Ishii et al. | 364/424.1 |
| 5,050,079 | 9/1991 | Steeby | 364/424.1 |
| 5,063,814 | 11/1991 | Baba et al. | 477/161 |
| 5,070,746 | 12/1991 | Milunas et al. | 477/121 |
| 5,072,390 | 12/1991 | Lentz et al. | 364/424.1 |
| 5,091,854 | 2/1992 | Yoshimura et al. | 364/424.1 |
| 5,109,696 | 5/1992 | Bright et al. | 73/118.1 |
| 5,119,695 | 6/1992 | Milunas et al. | 477/98 |
| 5,142,945 | 9/1992 | Shimanaka | 477/154 |

*Primary Examiner*—Kevin J. Teska
*Assistant Examiner*—Jacques Louis-Jacques
*Attorney, Agent, or Firm*—James R. Yee

[57] ABSTRACT

The present invention provides a sensing system and method for providing information relating to a drivetrain during shifting operations. The drivetrain includes an engine, a torque converter and a transmission. The system includes sensors for detecting the output speed of the engine, the output speed of the torque converter, and the output speed of the transmission. The system detects the starting condition of a shifting operation, responsively determines a set of performance parameters, and produces a set of performance parameter signals.

26 Claims, 11 Drawing Sheets

5,594,643

METHOD AND SYSTEM FOR DIAGNOSING A DRIVETRAIN DURING SHIFTING OPERATIONS

This is a file wrapper continuation of application Ser. No. 08/021,439, filed Feb. 24, 1993, now abandoned.

TECHNICAL FIELD

This invention relates generally to an apparatus and method for providing information relating to a drivetrain and, more particularly, an apparatus and method for providing information relating to the drivetrain during shifting operations.

BACKGROUND ART

The growth in the use of electronics on vehicles, for example, earthmoving or construction vehicles, has increased the need for improved and more complex diagnostic and prognostic capabilities.

The effect of this increasing need is that an increasing amount information in terms of quantity, reliability, detail, relating to the operation of the vehicles and its systems is needed.

For example, a vehicle's drivetrain is becoming increasingly more electrical in the nature of electronic controls and diagnostics/prognostics. In order to perform these more complex functions, additional information relating to the operation of the drivetrain is needed.

One type of information that is easily attainable is the rotational speed of the rotating members of the drivetrain. The rotational speed of the output of the engine, torque converter, and transmission can provide an indication of whether the drivetrain is operating correctly, for example, in the desired gear ratio.

However, other transmission and torque converter conditions are not so easily attainable. The torque converter and transmission are operated through a series of clutches which provide various gear ratios. Shifting between gear ratios involves complex timing of the operation of these clutches. In order to provide an indication of whether the clutches are operating correctly, that is, in the right sequence or with the correct timing, it is desirous to acquire more information relating to the timing of the shifting of these clutches.

One way to accomplish this is to use a set of pressure sensors within the torque converter and transmission which would give an indication of the clutch positions. From this sensor information, the timing of the clutches could be determined.

However, torque converters and transmissions are highly engineered devices. The clutches and gears must operate in an extremely coordinated manner. Furthermore, there is not a lot of room within the respective housings. As a result, placing sensors within the transmission and/or torque converter is an expensive undertaking in the terms of engineering and manufacturing costs.

It is therefore desirable to provide an inexpensive and reliable sensor system which provides timing information relating to a shifting operation of a drivetrain.

The present invention is directed at solving one or more of the problems as set forth above.

DISCLOSURE OF THE INVENTION

In one aspect of the present invention a sensing system for providing information relating to a drivetrain during shifting operations is provided. The drivetrain includes an engine and a transmission. The system includes sensors for detecting the output speed of the engine, the input speed of the transmission, and the output speed of the transmission. The system detects the starting condition of a shifting operation, responsively determines a set of performance parameters, and produces a set of performance parameter signals.

In another aspect of the present invention, a method of providing information relating to a drivetrain during shifting is provided. The drivetrain includes an engine and a transmission. The method includes the steps of sensing the rotational output speed of the engine, the input speed of the transmission, and the output speed of the transmission. The method further includes the steps of detecting the starting condition of a shifting operation, responsively determining a set of performance parameters, and producing a set of performance parameter signals.

BEST MODE FOR CARRYING OUT THE INVENTION

Figure 1:
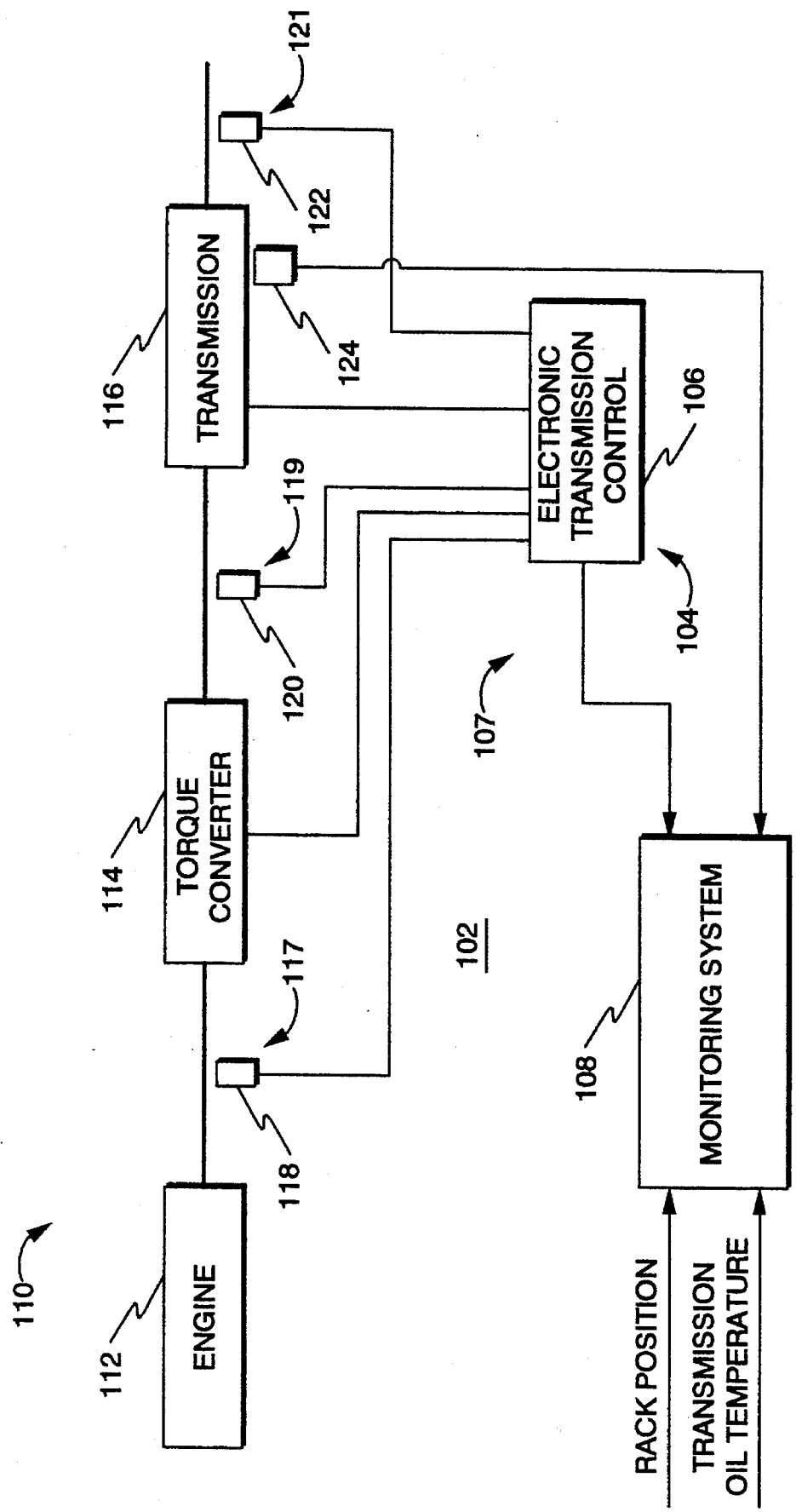
FIG. 1 is a block diagram of a vehicle's drivetrain connected to the present invention, embodied in a monitoring system.

With reference to FIG. 1, the present invention or sensing system 102 is adapted to provide diagnostic and prognostic information relating to the operation of a vehicle's drivetrain 110. The drivetrain 110 includes an engine 112, a torque converter 114, and a transmission 116. Preferably, the torque converter 114 includes a lockup clutch.

The transmission 116 is controlled through a means 104. In the preferred embodiment, the transmission controlling means 104 includes an electronic transmission control 106. Such drivetrain/electronic control systems are well-known in the art and need not be discussed further.

The present invention is embodied in a system 102 and method for determining specific performance parameters of the drivetrain 110. Specifically, the performance parameters are related to the operating performance of the drivetrain 110 during a shifting operation, that is, the changing of the transmission from a previous gear ratio to a next gear ratio. More particularly, the performance parameters are indicative of a series of parameters which are used to determine the shift times across the torque converter 114 and the transmission 116.

In one embodiment, the performance parameters are determined in the electronic transmission control 106. The system 102 also includes a monitoring system 108 which receives the parameters from the electronic transmission control 106 and stores and/or displays the data.

In the preferred embodiment, the monitoring system selectively stores the parameter as a function of other "trapping" factors. For example, the data may be stored only when the rack position and the transmission oil temperature have passed a threshold. This "trapping" function reduces the amount of information being stored resulting in a reduction in the size of the required storage device while ensuring relevant data would be stored.

In still another embodiment, the monitoring system 108 and the electronic transmission control 106 are embodied in one control module.

In another embodiment, the monitoring system 108 performs both the determination and storing functions.

Preferably, the monitoring system 108 and the electronic transmission control 106 are micro-processor based.

In still another embodiment, the system 102 and method relay the information to outside of the system, for example, to a diagnostic/prognostic module, or to a destination separate from the vehicle through a radio data link or a satellite data link.

A means 117 senses the rotational output speed of the engine 112 and responsively produces an engine speed signal. In the preferred embodiment, the means 117 includes a sensor 118.

A means 119 senses the rotational output speed of the torque converter 114 and responsively produces a torque converter output or transmission input speed signal. In the preferred embodiment, the means 119 includes a sensor 120.

It should be noted that in some vehicles, the torque converter and the transmission are coupled through an additional gear box (not shown). In such vehicles, the transmission input speed is not equal to the torque converter output speed. For such systems, separate sensing means would sense the rotational output speed of the torque converter and the rotational input speed of the transmission. Additionally in the calculations below, the torque converter input speed is used in the LUC calculations and the transmission input speed is used in the transmission calculations.

However for the remaining discussion, it is assumed that the torque converter and transmission are directly coupled by a drive shaft. In such vehicles therefore, the torque converter output speed and the transmission input speed are equal and are therefore interchangeable.

A means 121 senses the rotational output speed of the transmission 116 and responsively produces a transmission output speed signal. In the preferred embodiment, the means 121 includes a sensor 122.

The sensors 118,120,122 may include magnetic speed pickup sensors, Hall effect sensors, tachometers, or other suitable measuring means.

A means 107 receives the engine speed signal, transmission input speed signal, and transmission output speed signal and responsively detects the starting condition of a shifting operation, and determines a set of performance parameters.

The means 107 also receives a list of parameters describing the status of the LUC and transmission. In the preferred embodiment, the list of parameters includes gear spool position, LUC solenoid, transmission upshift solenoid, and transmission downshift solenoid.

The means 107 includes the monitoring system 108. The means 107 receives the signals directly from the sensors 118,120,122. The means 107 may be implemented in the electronic transmission control 106 or the monitoring system 108.

Figure 2:
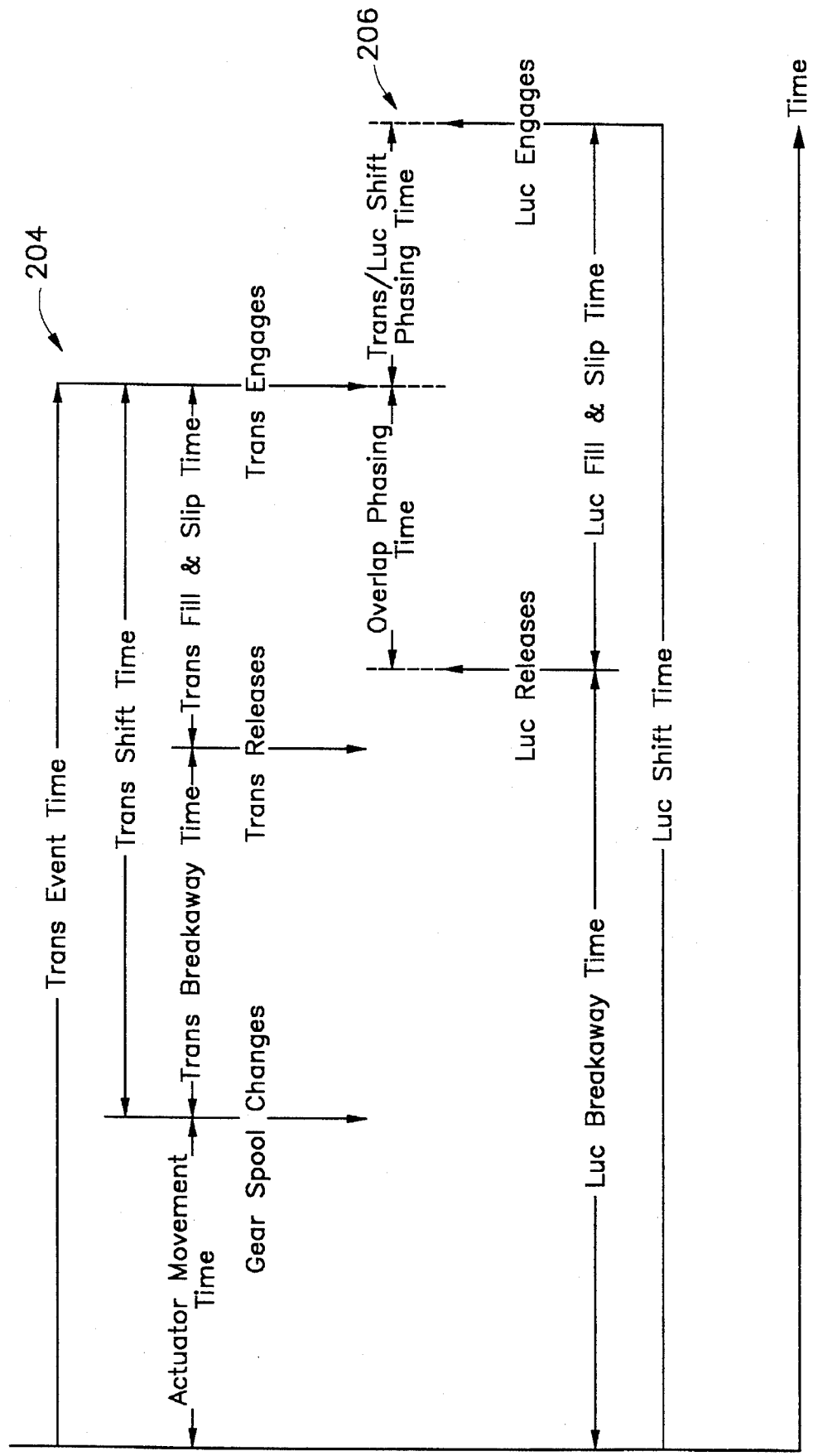
FIG. 2 is a timeline illustrating events that occur in the drivetrain of FIG. 1 during a shifting operation.

With reference to FIG. 2, the timing diagram of a shifting operation is illustrated. The top time line 204 shows the relative timing of conditions relating to the transmission 116. The lower time line 206 shows the relative timing of condition relating to the torque converter 114.

The beginning of the shift occurs at $t_0$. At the beginning of the shift, the electronic transmission control 106 actuates a gear spool by actuation of a solenoid. The time between the "firing" of the solenoid and the movement of the gear spool to a valid position is termed the actuator movement time.

In the preferred embodiment, the drivetrain is shifted by firing of the LUC solenoid and one of either a transmission up solenoid or a transmission down solenoid. The beginning of a shift can be detected through the firing of any of the three solenoids.

In the preferred embodiment, a rotary encoder or position sensor 124 detects when the spool gear is in a valid position.

In the preferred embodiment, a valid gear position is defined as being one more or one less than the previous gear position.

After the gear spool reaches a valid position, the time between the end of the actuator movement time and the time it takes the clutches of the transmission to release is termed the transmission breakaway time.

The transmission fill & slip time is defined as the time between the occurrence of the transmission being released from the previous gear (transmission breakaway) to the occurrence of the transmission being engaged in the next gear ratio (transmission engagement), that is, $t_3-t_1$.

The transmission shift time is defined as the time between actuator movement time and the engagement of the transmission in the next gear ratio.

The total transmission event time, that is, from actuation of the solenoid to the engagement of the transmission is termed the transmission event time.

Regarding the torque converter 114, the time between the beginning of movement of the LUC solenoid actuator and the time at which the lockup clutch (LUC) releases is termed the LUC breakaway time.

The LUC fill & slip time is defined as the time between release of the LUC (LUC breakaway) and engagement of the LUC (LUC engagement), that is, $t_4-t_2$.

The total LUC event time, that is from beginning of movement of the LUC solenoid actuator and LUC engagement is termed the LUC shift time.

In the preferred embodiment, the set of performance parameters includes two parameters relating to two synchronous occurrences in both the transmission 116 and the torque converter 114. The overlap phasing time is defined as the time between LUC breakaway and transmission engagement. The time between transmission engagement and LUC engagement is termed the transmission/LUC shift phasing time.

The sensing system 102 may also be adapted to perform sensor diagnostics on the sensors 118,120,122. A fault condition, that is, the condition of at least one of the sensors providing false data is detected during a nonshift period. Each of the sensors signals are compared with the others.

During a nonshift condition since the torque converter 114 is locked, the engine output speed signal should be approximately equal to the torque converter output speed signal. Also, the torque converter output speed signal (or transmission input speed signal) multiplied by the current gear ratio should be approximately equal to the transmission output speed signal. If either of the two conditions are not met, a fault condition occurs.

The steps used to determine each of the above time periods are discussed below.

With reference to FIGS. 3–7, the determination of the performance parameters will be described in more detail with respect to a method according to an embodiment of the present invention. The data shown in FIGS. 3–5 was taken during a 1–2 shift, that is, from first gear to second gear.

Figure 6:
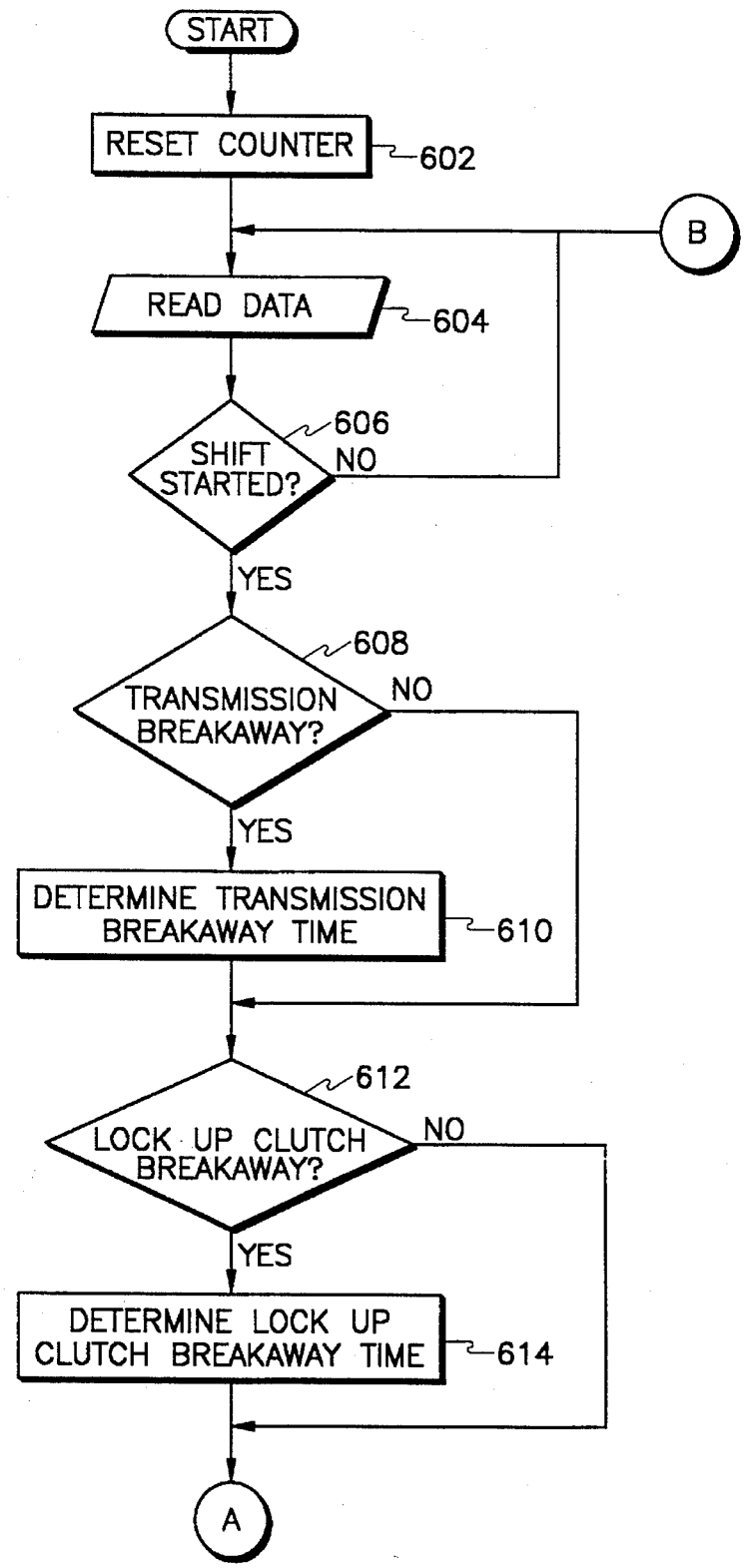
FIG. 6 is a first portion of a flow diagram illustrating calculation of the performance parameters of FIG. 2, according to an embodiment of the present invention.
Figure 7:
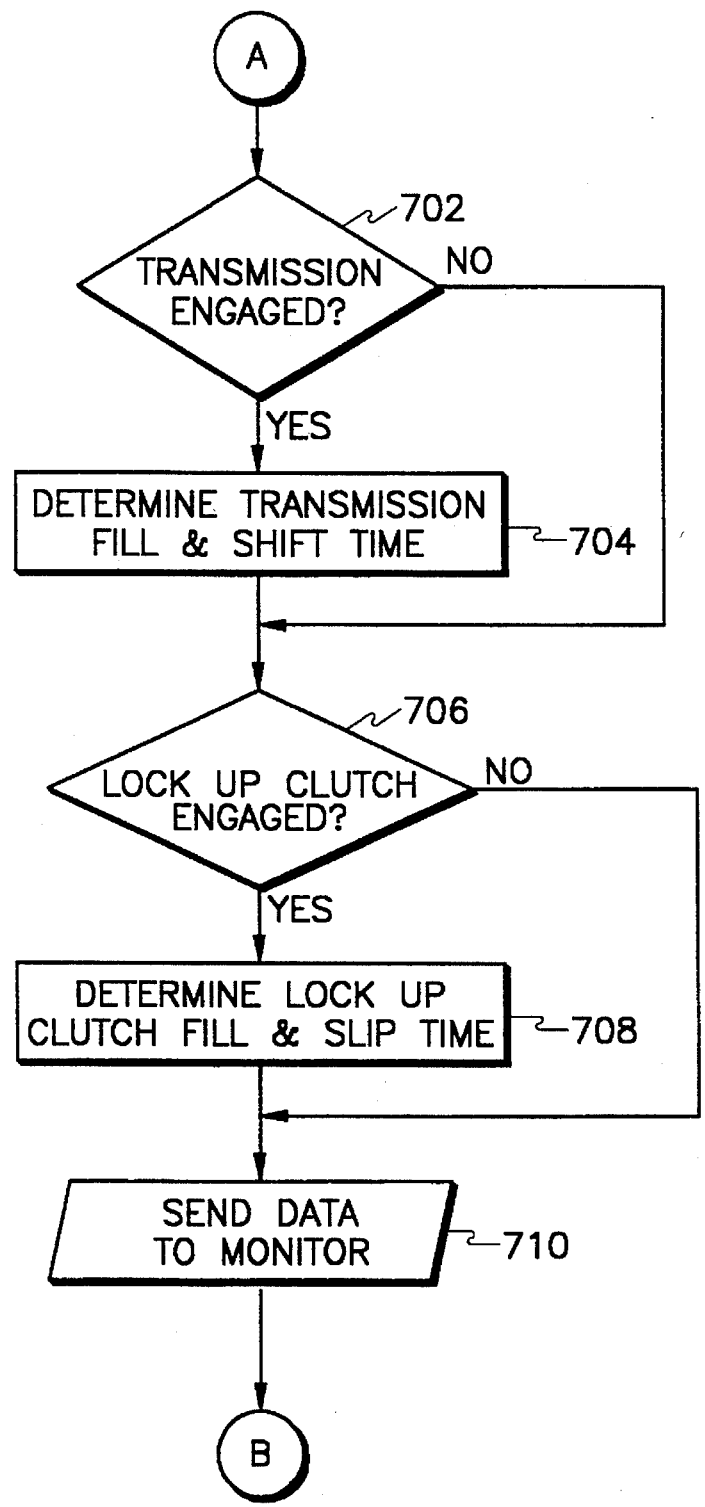
FIG. 7 is a second portion of the flow diagram of FIG. 6.
Figure 8:
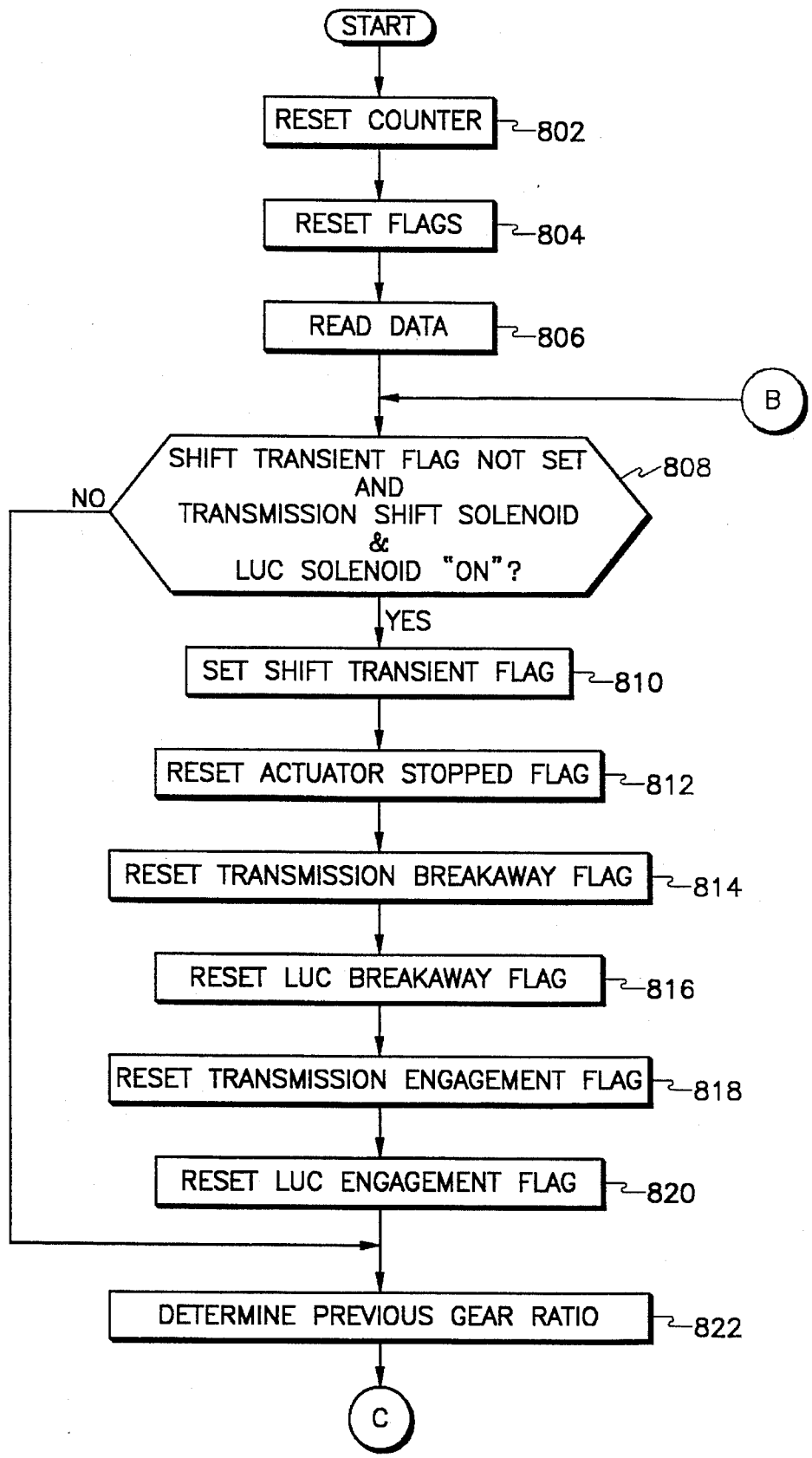
FIG. 8 is a first portion of a flow diagram illustrating calculation of the performance parameters of FIG. 2, according to another embodiment of the present invention.
Figure 9:
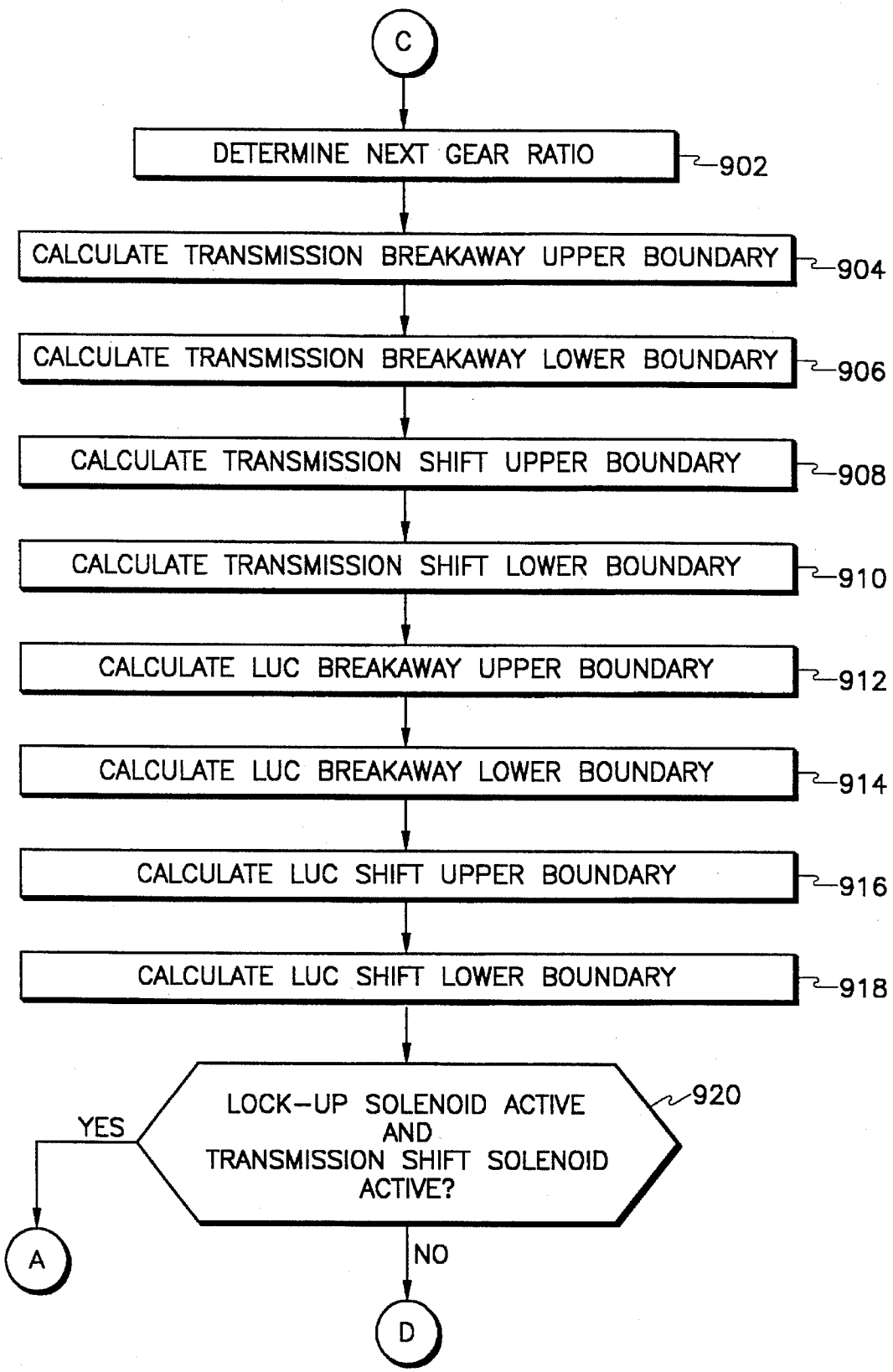
FIG. 9 is a second portion of the flow diagram of FIG. 8.
Figure 10:
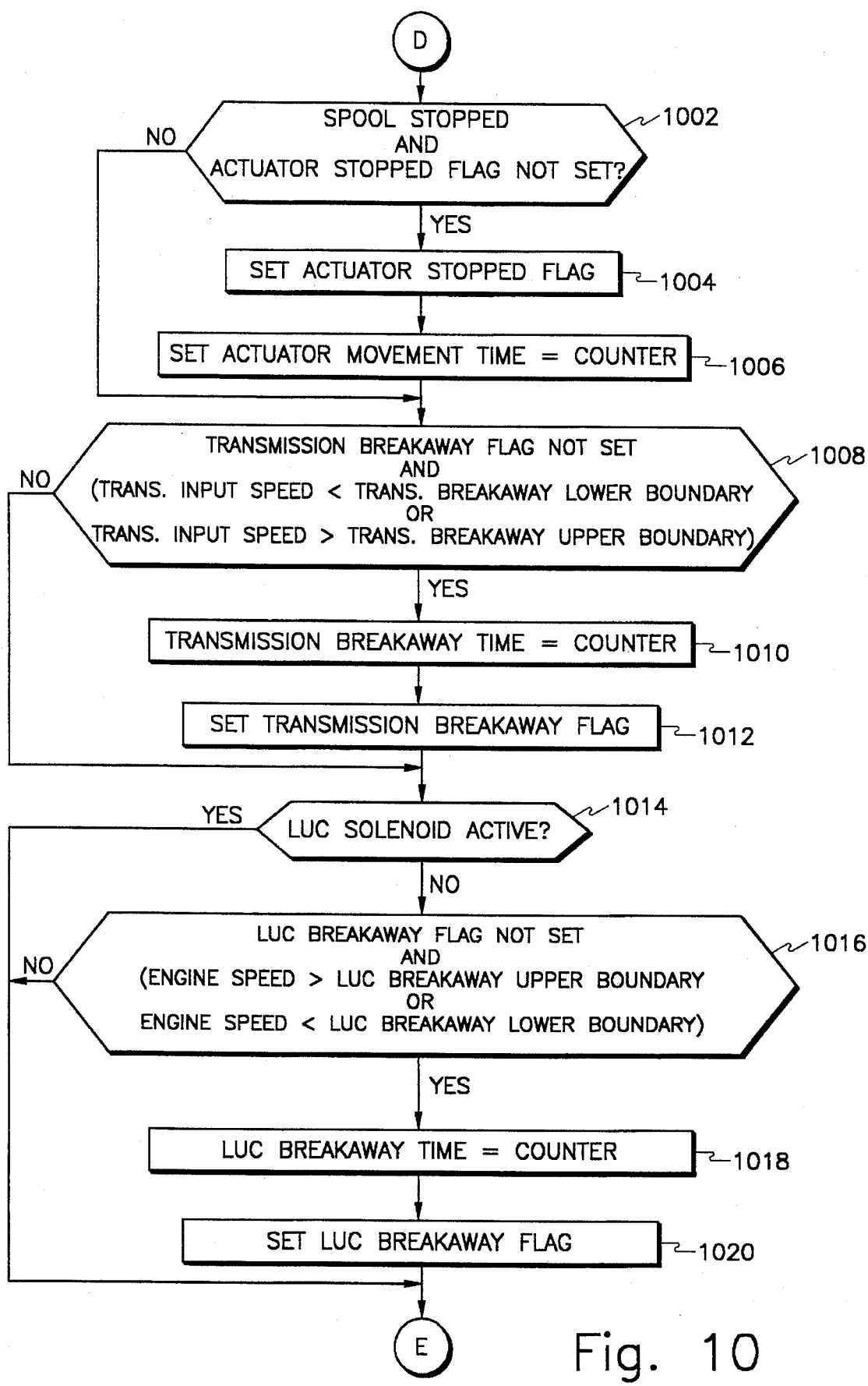
FIG. 10 is a third portion of the flow diagram of FIG. 8.
Figure 11:
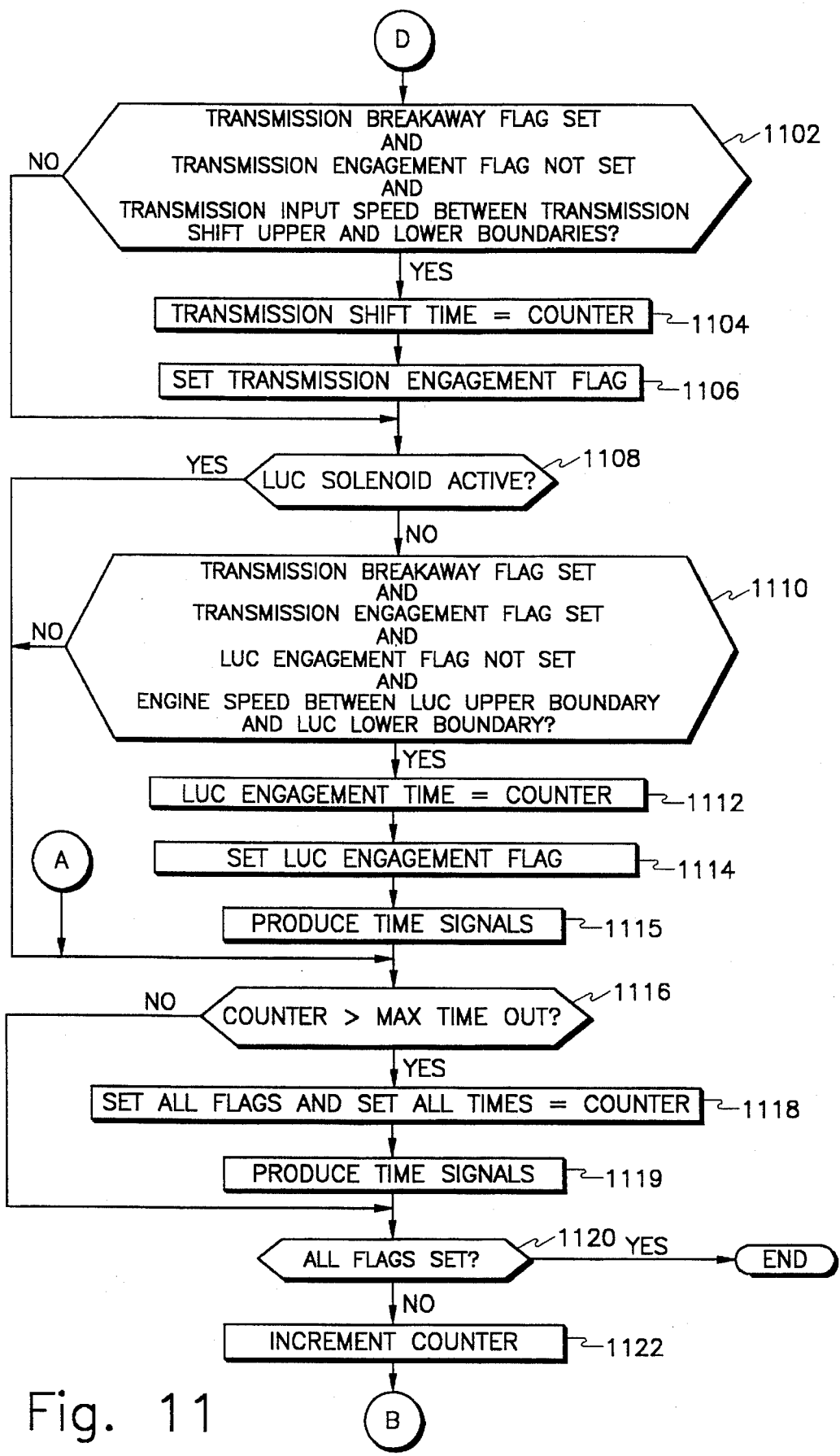
FIG. 11 is a fourth portion of the flow diagram of FIG. 8.

Referring to FIG. 6, in a first control block 602, a counter is reset. In a second control block 604, data is read from the sensors. The read data includes sensor and actuator information. The method includes the steps of sensing the output speed of the engine 112, the rotational input speed of the transmission 116 and the output speed of the transmission 116 and sensing internal LUC and transmission data from the electronic transmission control.

In a first decision block 606 if a shift has started, control proceeds to a second decision block 608. If a shift has not started, then control returns to the second control block 604. For discussion purposes, the start of each shift is defined as time, $t_0$.

In the second decision block 608, if transmission breakaway has occurred then control proceeds to a third control block 610. If transmission breakaway has not occurred then control proceeds to a third decision block 612. Transmission breakaway is defined as the condition of the transmission having been released from the previous gear.

Figure 3:
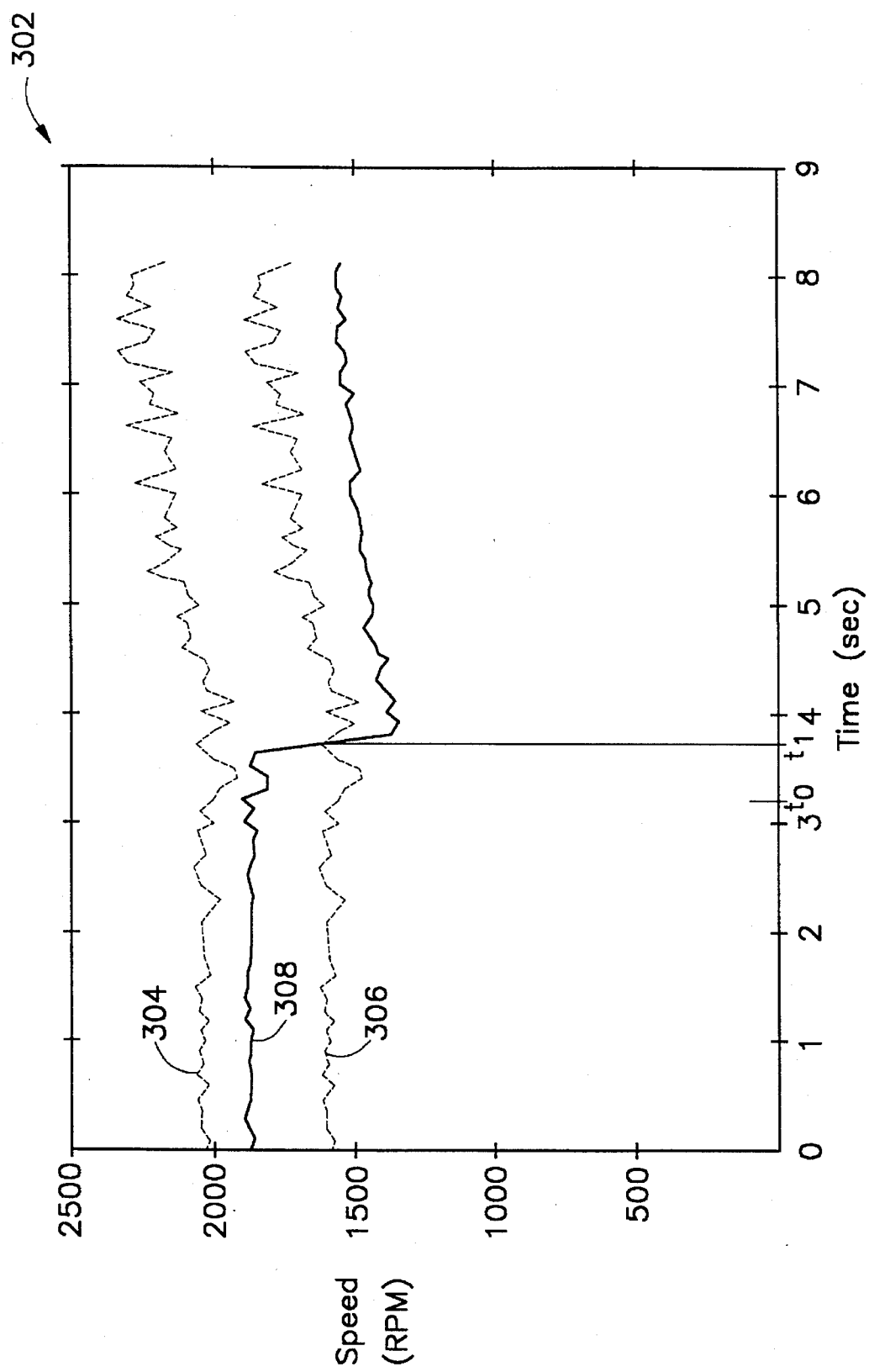
FIG. 3 is a graph illustrating the detection of transmission breakaway.

In the preferred embodiment, the transmission breakaway condition is detected when the transmission input speed diverges out of an area defined by the transmission output speed and a predefined window. With reference to FIG. 3, line trace 304 represents the transmission output speed multiplied by a first upper window factor. Line trace 306 represents the transmission output speed multiplied by a first lower window factor. Line trace 308 represents the transmission input speed.

The first upper and lower window factors are determined by the equations:

first upper window factor=previous gear ratio·(1+upper_ratio)

and first lower window factor=previous gear ratio·(1−lower_ratio), where, $0 \leq$ upper_ratio $\leq 1$ and $0 \leq$ lower_ratio $\leq 1$.

In the preferred embodiment, upper_ratio and lower_ratio are equal to 0.12. However, upper_ratio and lower_ratio values will vary between transmissions and are derived experimentally.

As shown, prior to a shift, the transmission input speed is within the area defined by the transmission output speed and the first upper and lower window factors. At time $t_1$, when the transmission input speed diverges out of this area, transmission breakaway has occurred. In other words transmission breakaway has occurred when the following is TRUE:

transmission input speed <
  transmission output speed · first lower
  window factor
    OR
transmission input speed >
  transmission output speed · first upper
  window factor.

In the third control block 610, the transmission breakaway time is determined. As discussed above, the transmission breakaway time is defined as the time between when the gear spool has reached a valid position and transmission breakaway. The transmission breakaway time and the other times discussed below are set equal to the current value of the counter which is incremented every loop or pass of the flow diagram.

In the third decision block 612, if lock up clutch (LUC) breakaway has occurred then control proceeds to a fourth control block 614. If LUC breakaway has not occurred then control proceeds to a fourth decision block 702.

Figure 5:
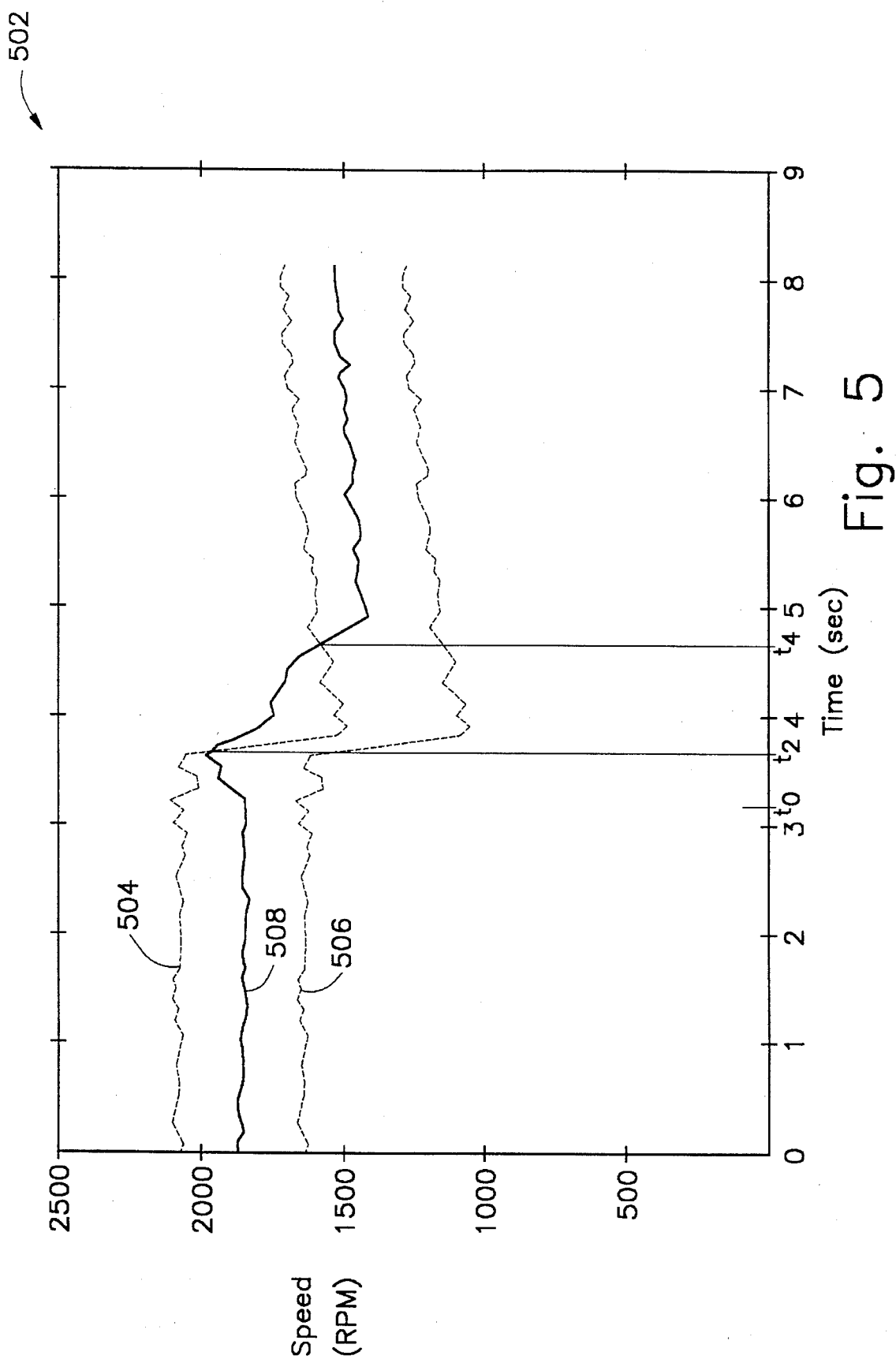
FIG. 5 is a graph illustrating the detection of LUC breakaway and LUC engagement.

In the preferred embodiment, the LUC breakaway condition is detected when the engine speed diverges out of an area defined by the transmission input speed and a second predefined window. With reference to FIG. 5, line trace 504 represents the transmission input speed multiplied by a second upper window factor. Line trace 506 represents the transmission input speed multiplied by a second lower window factor. Line trace 508 represents the engine speed.

In the preferred embodiment, the second upper and lower window factors are determined by the equations:

second upper window factor=(1+upper_ratio)

and second lower window factor=(1−lower_ratio), where, $0 \leq$ upper_ratio $\leq 1$ and $0 \leq$ lower_ratio $\leq 1$.

As shown prior to LUC breakaway, the engine speed is within the area defined by the transmission input speed and the second upper and lower window factors. At time $t_2$, when the engine speed diverges out of this area, LUC breakaway has occurred. In other words LUC breakaway has occurred when the following is TRUE:

engine speed <
  transmission input speed · second lower
  window factor
    OR
engine speed >
  transmission input speed · second upper
  window factor.

In the fourth control block 614, the LUC breakaway time is determined. As discussed above, the LUC breakaway time is defined as the time between the firing of the LUC solenoid which actuates the LUC spool and LUC breakaway.

In the fourth decision block 702, if the transmission has engaged then control proceeds to a fifth control block 704. If the transmission has not engaged the control proceeds to a fifth decision block 706.

Figure 4:
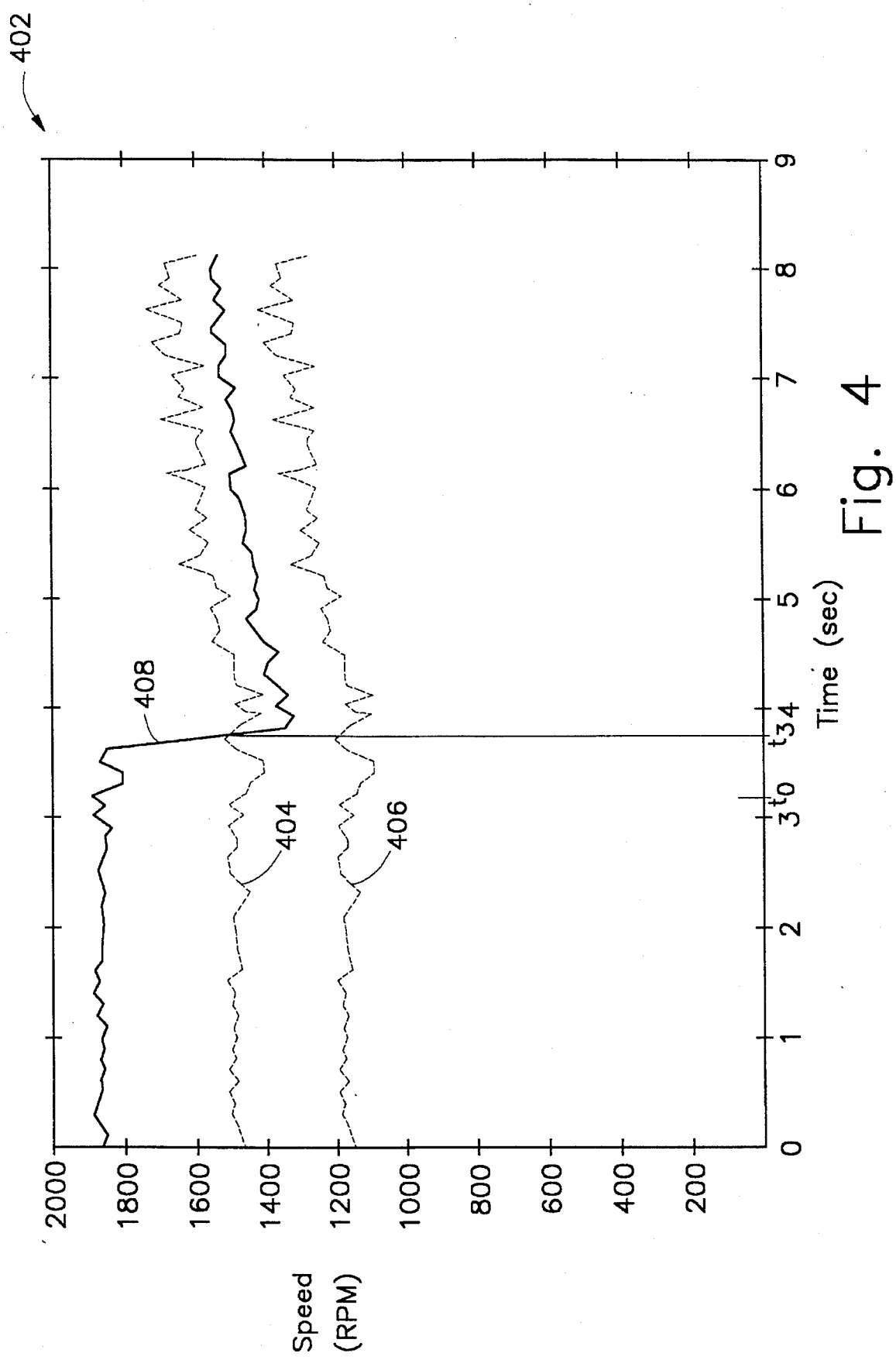
FIG. 4 is a graph illustrating the detection of transmission engagement.

In the preferred embodiment, transmission engagement is detected when the transmission input speed converges into an area defined by the transmission output speed and a third predefined window. With reference to FIG. 4, line trace 404 represents the transmission output speed multiplied by a third upper window factor. Line trace 406 represents the transmission output speed multiplied by a third lower window factor. Line trace 408 represents the transmission input speed.

In the preferred embodiment, the third upper and lower window factors are determined by the equations:

third upper window factor=next gear ratio·1+upper__ratio and third lower window factor=next gear ratio·1−lower__ratio, where, $0 \leq$ upper__ratio $\leq 1$ and
$0 \leq$ lower__ratio $\leq 1$.

As shown prior to transmission engagement, the transmission input speed is outside of the area defined by the transmission output speed and the third upper and lower window factors. At time $t_3$, when the transmission input speed converges into this area, transmission engagement has occurred. In other words transmission engagement has occurred when the following is TRUE:

transmission input speed >
    transmission output speed · third lower
    window factor
        AND
transmission input speed <
    transmission output speed · third upper
    window factor.

In the fifth control block 704, the transmission fill & slip time is determined. As discussed above, the transmission fill & slip time is defined as the time between the transmission release and transmission engagement.

In the fifth decision block 706, if the LUC has engaged, control proceeds to a sixth control block 708. If the LUC has not engaged, control proceeds to a seventh control block 710, where the data is sent to the monitor if all parameters have been calculated.

In the preferred embodiment, LUC engagement is detected when the engine speed converges into the area defined by the transmission input speed and the second predefined window.

Referring again to FIG. 5 as shown, prior to LUC engagement (after transmission engagement), the engine speed is outside of the area defined by the transmission input speed and the second upper and lower window factors. At time $t_4$, when the engine speed converges into this area, LUC engagement has occurred. In other words transmission engagement has occurred when the following is TRUE:

engine speed >
    transmission input speed · second lower
    window
        AND
engine speed <
    transmission input speed · second upper
    window factor.

In the sixth control block 708, the LUC fill & slip time is determined. As discussed above, the LUC fill & slip time is defined as the time between the LUC release and LUC engagement.

From the performance parameters determined above, three other parameters may be determined. The transmission event time is determined as the time between the firing of the solenoid to transmission engagement. The transmission shift time is determined as the difference between the time when the gear spool reaches a valid position and transmission engagement. And the LUC shift time is determined as the difference between the firing of the LUC solenoid and LUC engagement.

In a seventh control block 710, the performance parameters are sent to the monitoring system 108.

As stated above, after the performance parameters are determined they may be stored in memory (subject to the factors listed above), displayed to an operator, or relayed to a destination on or off the vehicle for analysis.

With reference to FIGS. 8–11, the determination of the performance parameters will be described in more detail with respect to a method according to another embodiment of the present invention.

In an eighth control block 802, a counter is reset. The counter is used to keep track of the time, The sensor system 102 is designed to perform the subsequent method in X seconds. In the preferred embodiment, X is equal to 0.1 seconds. The counter is incremented each loop of the method.

In a ninth control block 804 a set of flags are reset. The flags correspond to conditions within the shifting operation, that is, a set flag indicates that a specific condition has been met and a reset flag indicates that the condition has not been met. The individual flags will be discussed below.

In a tenth control block 806, the sensor data is read.

In a sixth decision block 808, if a shift has started, control proceeds to an eleventh control block 810. If a shift has not started, then control proceeds to a seventeenth control block 822. For discussion purposes, the start of each shift is defined as time, $t_0$. In the preferred embodiment, the start of shift is detected if:

1) the shift transient flag is not set AND 2) the transmission shift solenoid and LUC solenoids are "ON".

The shift transient flag is set during the shifting operation. The transmission shift solenoid and the LUC solenoid are "ON", that is, actuated, at the beginning of the shift.

In the eleventh control block 810, the shift transient flag is set. In a twelfth control block 812, an actuator stopped flag is reset. In a thirteenth control block 814, a transmission breakaway flag is reset. In a fourteenth control block 816, a LUC breakaway flag is reset. In a fifteenth control block 818, a transmission engagement flag is reset. In a sixteenth control block 820, a LUC breakaway flag is reset.

In the seventeenth control block 822, a previous gear ratio is determined. In an eighteenth control block 902, a next gear ratio is determined. The next gear ratio is determined from the gear spool position read from the electronic transmission control. The gear ratios are stored a priori in a one dimensional array. The next gear ratio is indexed from the array using the gear position provided by the electronic transmission control 106.

In a nineteenth control block 904, a transmission breakaway upper boundary is determined. In the preferred embodiment, the transmission breakaway upper boundary is determined by:

transmission output speed·previous gear ratio·(1+upper__ratio), where $0 \leq$ upper__ratio $\leq =1$.

In a twentieth control block 906, a transmission breakaway lower boundary is determined. In the preferred embodiment, the transmission breakaway lower boundary is determined by:

transmission output speed·previous gear ratio·(1−lower_ratio), where

0≦lower_ratio≦1.

In a twenty-first control block 908, a transmission shift upper boundary is determined. In the preferred embodiment, the transmission shift upper boundary is determined by:

transmission output speed·next gear ratio·(1+upper_ratio), where

0≦upper_ratio≦1.

In a twenty-second control block 910, a transmission shift lower boundary is determined. In the preferred embodiment, the transmission lower boundary is determined by:

transmission output speed·next gear ratio·(1−lower_ratio), where

0≦lower_ratio≦1.

In a twenty-third control block 912, a LUC breakaway upper boundary is determined. In the preferred embodiment, the LUC breakaway upper boundary is determined by:

transmission input speed·(1+upper_ratio), where

0≦upper_ratio≦1.

In a twenty-fourth control block 910, a LUC breakaway lower boundary is determined. In the preferred embodiment, the transmission lower boundary is determined by:

transmission input speed·(1−lower_ratio), where

0≦lower_ratio≦1.

In a twenty-fifth control block 916, a LUC shift upper boundary is determined. In a twenty-sixth control block 918, a fourth or LUC shift lower boundary is determined. In the preferred embodiment, the LUC shift upper and lower boundaries are equal to the LUC breakaway upper and lower boundaries, respectively.

In a seventh decision block 920 if the transmission shift solenoid is active, control proceeds to a fifteenth decision block 1116. If the transmission shift solenoid is not active then control proceeds to an eighth decision block 1002.

In the eighth decision block 1102, if the gear spool has stopped, that is, in a valid position, AND the actuator stopped flag is not set, then control proceeds to a twenty-seventh control block 1004. Otherwise, control proceeds to a ninth decision block 1008.

In the twenty-seventh control block, the actuator stopped flag is set. This indicates that the gear spool is in a valid position.

In a twenty-eighth control block 1006, actuator movement time is set equal to the counter.

In the ninth decision block 1008, if transmission breakaway has occurred then control proceeds to a twenty-ninth control block 1010. If transmission breakaway has not occurred then control proceeds to a tenth decision block 1014. Transmission breakaway is detected if the transmission breakaway flag is not set AND one of the following:

--- transmission input speed
 < transmission breakaway lower boundary
OR
transmission input speed
 > transmission breakaway upper boundary.

---

In the twenty-ninth control block 1010, transmission breakaway time is set equal to the counter.

In the thirtieth control block 1012, the transmission breakaway flag is set.

In the tenth decision block 1014, if the LUC solenoid is not active, then control proceeds to a eleventh decision block 1016. If the LUC solenoid is not active, control proceeds to a twelfth decision block 1102.

In the eleventh decision block 1016, if lock up clutch (LUC) breakaway has occurred then control proceeds to a thirty-first control block 1018. Otherwise, control proceeds to the twelfth decision block 1102.

LUC breakaway is detected if the LUC breakaway flag is not set AND one of the following:

--- engine speed
 > LUC breakaway upper boundary
OR
engine speed
 < LUC breakaway lower boundary.

---

In the thirty-first control block 1018, LUC breakaway time is set equal to the counter.

In the thirty-second control block 1020, the LUC breakaway flag is set.

In the twelfth decision block 1102, if the transmission has engaged then control proceeds to a thirty-third control block 1104. If the transmission has not engaged the control proceeds to a thirteenth decision block 1108.

In the preferred embodiment, transmission engagement is detected if the transmission breakaway flag is set AND the transmission engagement flag is not set AND if the transmission input speed is between the transmission upper shift boundary and the transmission lower shift boundary.

In the thirty-third control block 1104, transmission shift time is set equal to the current value of the counter.

In a thirty-fourth control block 1106 the transmission engagement flag is set.

In the thirteenth decision block 1108, if the LUC solenoid is active, control proceeds to the fifteenth decision block 1116. If the LUC solenoid is not active, then control proceeds to a fourteenth decision block 1110.

In the fourteenth decision block 1110, if the LUC has engaged, control proceeds to a thirty-fifth control block 1112. If the LUC has not engaged, control proceeds to the fifteenth decision block 1116.

LUC engagement is detected if the transmission breakaway flag is set, the transmission flag is set, the LUC engagement flag is not set AND the engine speed is between the LUC upper and lower boundaries.

In the thirty-fifth control block 1112, LUC engagement time is set equal to the current value of the counter.

In a thirty-sixth control block 1114, the LUC engagement flag is set.

In a thirty-seventh control block 1115, signals indicative of the performance parameters are produced. As discussed above, the parameters may be displayed, stored in the monitoring system 108, or sent to a destination on or off the vehicle.

In the fifteenth decision block 1116, if the counter is greater then a predetermined maximum time out value then control proceeds to a thirty-eighth control block 1118. If the counter is not greater than the maximum time out value then control proceeds to a fortieth control block 1120.

In the thirty-eighth control block 1118, all the flags are set and all times are set equal to the counter. This is indicative of a fault condition.

In a thirty-ninth control block 1119, signals indicative of the performance parameters are produced.

In the sixteenth decision block 1120, if all the flags are set then the method is complete (and the process is begun anew).

If the flags are not all set then control proceeds to a fortieth control block 1122. In the fortieth control block 1122, the counter is incremented. As discussed above in the preferred embodiment, each count of the counter is indicative of a tenth of a second. Control then returns to the sixth decision block 808.

INDUSTRIAL APPLICABILITY

With reference to the drawings and in operation, the present invention provides information relating to the operation of a vehicle's drivetrain during a shifting operation.

The system 102 receives sensor data indicative of the engine output speed, the transmission input speed, and the transmission out speed.

The system 102 may be implemented as part of a electronic transmission control 106, a separate module, or as part of another electronic control module. The electronic transmission control 106 signals when it has actuated a transmission clutch solenoid and the lock up clutch solenoid. These two occurrences coincide at the beginning of a shifting operation from a previous gear to a next gear.

The system 102, based on the sensor signals, determines a set of performance parameters of the shifting operation.

In the preferred embodiment, the parameters are detected by comparison of the sensor data with predetermined areas or windows. The predetermined areas are also functions of the sensor data, as discussed above.

In the preferred embodiment, these relationships are determined "on the fly", that is, continuously every 0.1 seconds.

The system produces a set of signals indicative of the value of the performance parameters.

In one embodiment, the performance parameter signals are communicated to a location off the vehicle.

In another embodiment, the performance parameter signals are communicated to a destination on the vehicle, for example, to another control module.

In still another embodiment, the performance parameters are stored onboard the vehicle. In the preferred embodiment, the performance parameters are stored or "trapped" in a storage device depending upon other factors, for example, oil temperature and rack position.

Other aspects, objects, and features of the present invention can be obtained from a study of the drawings, the disclosure, and the appended claims.

We claim:

1. A system for providing information relating to a drivetrain during shifting operations, the drivetrain includes an engine, a torque converter and a transmission, wherein a shifting operation is initiated by an electronic transmission control via actuation of a gear spool by a solenoid, comprising:

a sensor for detecting, after initiation of the shifting operation when said gear spool is in a valid position and responsively producing a gear spool signal;

means for sensing a rotational output speed of the engine and responsively producing an engine speed signal;

means for sensing an output speed of the torque converter and responsively producing a torque converter speed signal;

means for sensing an output speed of the transmission and responsively producing a transmission output speed signal; and means for receiving said engine speed signal, torque converter speed signal and transmission output speed signal, responsively determining an actuator movement time as a function of said spool gear signal, for detecting transmission breakaway as a function of said torque converter speed signal and transmission output speed signal and determining a transmission breakaway time as a function of said spool gear signal and transmission breakaway, for detecting torque converter breakaway as a function of said engine speed signal and said torque converter speed signal and determining a LUC breakaway time as a function of torque converter breakaway, for detecting transmission engagement as a function of said torque converter speed signal and transmission output speed signal and determining a transmission output fill and slip time as a function of transmission breakaway and transmission engagement, and for detecting LUC engagement as a function of said engine speed signal and determining a LUC fill and slip time as a function of LUC breakaway and LUC engagement.

2. A system, as set forth in claim 1, wherein said set of performance parameters includes an overlap phasing time and a shift phasing time, said overlap phasing time being a function of LUC breakaway and transmission engagement and said shift phasing time being a function of transmission engagement and LUC engagement.

3. A system, as set forth in claim 1, wherein said performance parameter signals producing means includes means for storing said performance parameter signals.

4. A system, as set forth in claim 1, wherein said performance parameter signals producing means includes means for determining at least one trapping factor and storing said performance parameter signals as a function of said trapping factor.

5. A method of providing information relating to a drivetrain during a shifting operation, the drivetrain including an engine and a transmission, wherein a shifting operation is initiated by an electronic transmission control via actuation of a gear spool by a solenoid, including:

detecting, after initiation of the shifting operation, when said gear spool is in a valid position and responsively producing a gear spool signal;

sensing a rotational output speed of the engine and responsively producing an engine speed signal;

sensing an input speed of the transmission and responsively producing a transmission input speed signal;

sensing an output speed of the transmission and responsively producing a transmission output speed signal;

receiving said engine speed signal, transmission input speed signal, and transmission speed signal, responsively determining an actuator movement time as a function of said spool gear signal;

detecting transmission breakaway as a function of said transmission input speed signal and transmission speed signal and determining a transmission breakaway time as a function of said spool gear signal and transmission breakaway;

detecting torque converter breakaway as a function of said engine speed signal and said transmission input speed signal and determining a LUC breakaway time as a function of torque converter breakaway;

for detecting transmission engagement as a function of said transmission input speed signal and transmission speed signal and determining a transmission fill and slip time as a function of transmission breakaway and transmission engagement; and detecting LUC engagement as a function of said engine speed signal and determining a LUC fill and slip time as a function of LUC breakaway and LUC engagement.

6. A method, as set forth in claim 5, including the step of storing said performance parameter signals.

7. A method, as set forth in claim 6, wherein said step of determining a transmission breakaway time includes the steps of:

detecting a divergence condition of said transmission input speed signal relative to said transmission output speed signal; and, determining the time at which said divergence condition occurs.

8. A method, as set forth in claim 7, wherein said transmission breakaway time is a function of the time at which said divergence condition occurred and said actuator movement time.

9. A method as set forth in claim 7, wherein said step of detecting said divergence condition includes the step of defining a divergence area as a function of a previous gear ratio and a predetermined percentage width and wherein said divergence condition is defined as occurring when said transmission input speed signal leaves said divergence area.

10. A method, as set forth in claim 7, wherein said step of determining a transmission fill and slip time includes the steps of:

detecting a convergence condition of said transmission input speed signal relative to said transmission output speed signal;

determining the time at which said convergence condition occurs.

11. A method, as set forth in claim 10, wherein said transmission fill & slip time is a function of the time at which said convergence condition occurred and said transmission breakaway time.

12. A method, as set forth in claim 10, wherein said step of detecting said convergence condition includes the step of defining a convergence area as a function of a new gear ratio and a predetermined percentage width and wherein said convergence condition is defined as occurring when said transmission input speed signal enters said convergence area.

13. A method, as set forth in claim 11, including the step of determining a transmission shift time as a function of said transmission fill & slip time.

14. A method, as set forth in claim 10, where in the drivetrain includes a torque converter, the method including the step of detecting actuation of a lockup solenoid of the torque converter.

15. A method, as set forth in claim 14, wherein said step of determining LUC breakaway time includes the steps of:

detecting a divergence condition of said engine speed signal relative to said transmission input speed signal; and determining the time at which said divergence condition occurs.

16. A method, as set forth in claim 15, wherein said lockup breakaway time is a function of the time at which said divergence condition occurred and actuation of said lockup solenoid.

17. A method, as set forth in claim 15, wherein said step of said divergence condition includes the step of defining a divergence area as a function of said transmission input speed signal and a predetermined speed percentage width and wherein said divergence condition is defined as occurring when said engine speed signal leaves said divergence area.

18. A method, as set forth in claim 15, wherein said step of determining a LUC fill and slip time includes the steps of:

detecting a convergence condition of said engine speed signal relative to said transmission input speed signal; and determining the time at which said convergence condition occurred.

19. A method, as set forth in claim 18, wherein said LUC fill & slip time is a function of the time at which said convergence condition occurred and said lockup breakaway time.

20. A method, as set forth in claim 19, wherein said step of detecting said convergence condition includes the step of defining a convergence area as a function of said transmission input speed signal and a predetermined percentage width and wherein said convergence condition is defined as occurring when said engine signal enters said convergence area.

21. A method, as set forth in claim 18, including the step of determining a lockup shift time as a function of said lockup fill & slip time.

22. A method as set forth in claim 21, including the steps of:

determining a transmission event time as a function of said transmission fill & slip time.

23. A method, as set forth in claim 5, including the steps of determining at least one trapping factor and storing said performance parameter signals as a function of said trapping factor.

24. A method for providing information relating to a drivetrain during a shifting operation, the drivetrain including an engine, a torque converter, a transmission, and an electronic transmission control, including:

beginning the shifting operation by actuating a gear spool via the electronic transmission control and a solenoid;

detecting when said spool gear is in a valid position and responsively producing a spool gear signal;

determining an actuator movement time as a function of said spool gear signal;

sensing an input speed of the transmission and responsively producing a transmission input speed signal;

sensing an output speed of the transmission and responsively producing a transmission output speed signal;

detecting transmission breakaway as a function of said transmission input and output speed signals;

determining a transmission breakaway time as a function of said spool gear signal and transmission breakaway;

sensing a rotational output speed of the engine and responsively producing an engine speed signal;

detecting torque converter breakaway as a function of said engine speed signal and said transmission input signal;

determining a LUC breakaway time as a function of torque converter breakaway;

detecting transmission engagement as a function of said transmission input and output speed signals;

determining a transmission fill and slip time as a function of transmission breakaway and transmission engagement;

detecting LUC engagement as a function of said engine speed and said transmission input speed; and, determining a LUC fill and slip time as a function of LUC breakaway and LUC engagement.

25. A method, as set forth in claim 24, including the step of determining an overlap phasing time as a function of LUC breakaway and transmission engagement.

26. A method, as set forth in claim 24, including the step of determining a transmission/LUC shift phasing time as a function of transmission engagement and LUC engagement.

* * * * *